United States Patent [19]

Jacques et al.

[11] 3,956,736
[45] May 11, 1976

[54] DISC CARTRIDGE SECTOR FORMATTING ARRANGEMENT AND RECORD ADDRESSING SYSTEM

[76] Inventors: James O. Jacques, 6625 Bluebird Ave., Longmont, Colo. 80501;
Richard D. Cordano, 4120 Eutaw Drive, Boulder, Colo. 80302;
Robert F. Heidecker, 1046 Stuart St., Longmont, Colo. 80501;
Friedrich R. Hertrich, Sugarloaf Road, Boulder, Colo. 80302

[22] Filed: Mar. 18, 1974

[21] Appl. No.: 452,157

Related U.S. Application Data

[63] Continuation of Ser. No. 256,602, May 24, 1972, abandoned.

[52] U.S. Cl. .............................................. 340/172.5
[51] Int. Cl.² ........................................... G06F 13/00
[58] Field of Search ................................ 340/172.5

[56] References Cited
UNITED STATES PATENTS

| | | | |
|---|---|---|---|
| 3,337,852 | 8/1967 | Lee et al. | 340/172.5 |
| 3,348,213 | 10/1967 | Evans | 340/172.5 |
| 3,417,378 | 12/1968 | Simonsen et al. | 340/172.5 |
| 3,493,935 | 2/1970 | Questa | 340/172.5 |
| 3,525,081 | 8/1970 | Flemming, Jr. et al. | 340/172.5 |
| 3,573,766 | 4/1971 | Perkins | 340/174.1 |
| 3,587,058 | 6/1971 | Butler et al. | 340/172.5 |
| 3,725,864 | 4/1973 | Clark et al. | 340/172.5 |

*Primary Examiner*—Raulfe B. Zache

[57] ABSTRACT

A sector formatting and record addressing scheme and associated electronic recording and detection control systems for a removable cartridge disc used in a magnetic information storage unit. Indelible sector mark and record address/format information are electronically pre-recorded on the disc at the factory using a high precision cartridge writer. This cartridge writer phase-locks the recording clock to a magnetically recorded clocking disc rotating on the same shaft as the disc via an associated position transducer to write an exact number of bytes on each track having a precise physical relationship to each other. Separate recording clocks having a wide bit-frequency spectral separation are used to write sector mark and address/format data to provide maximum sector detection reliability. The cartridge writer control system computes the optimum length of sector code for the customer-specified record size. The sector format arrangement is designed to facilitate address checking and data recovery in the user environment with a minimum of control complexity.

14 Claims, 8 Drawing Figures

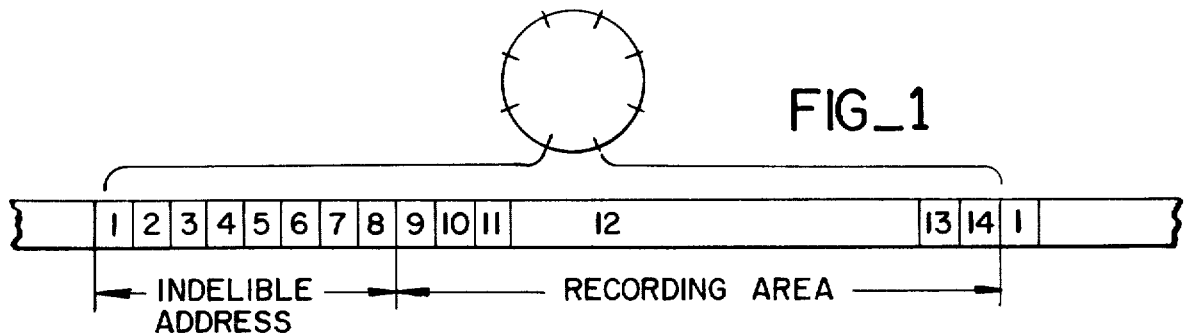
FIG_1
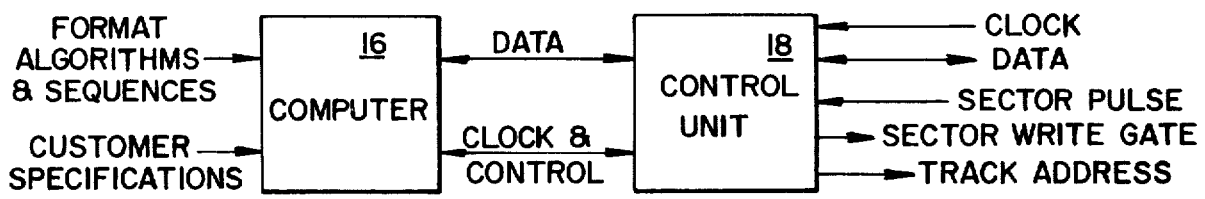
FIG_2
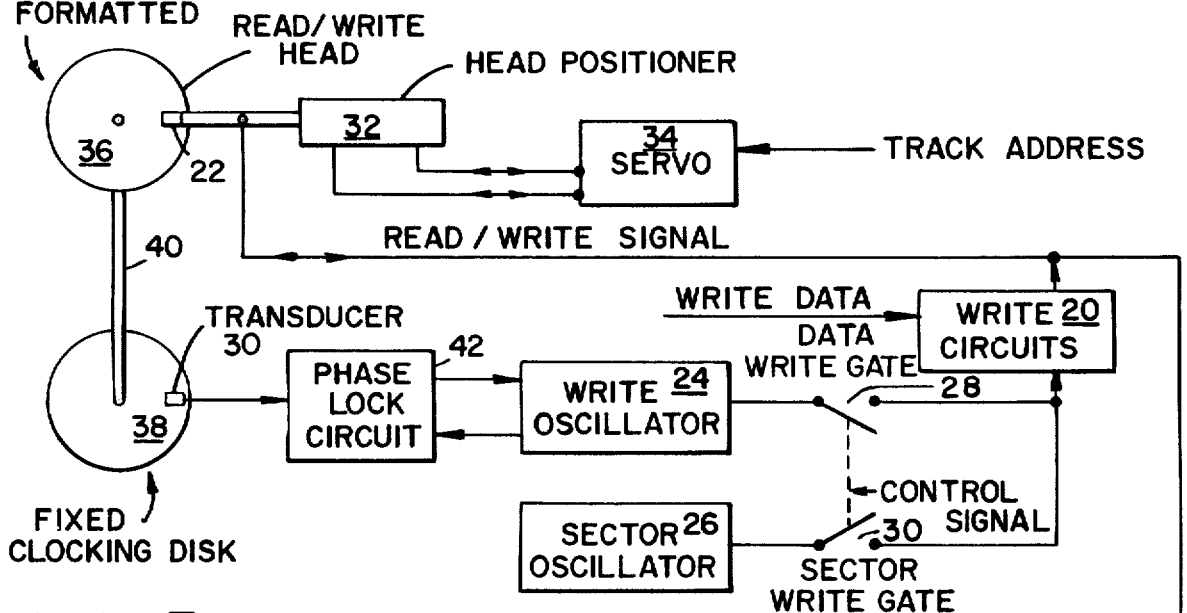
FIG_3
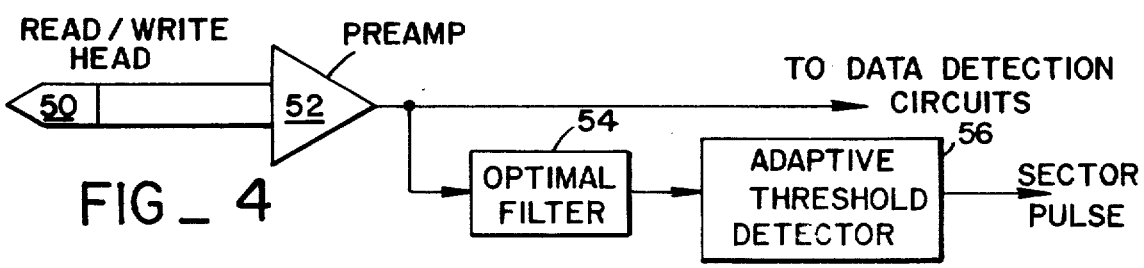
FIG_4

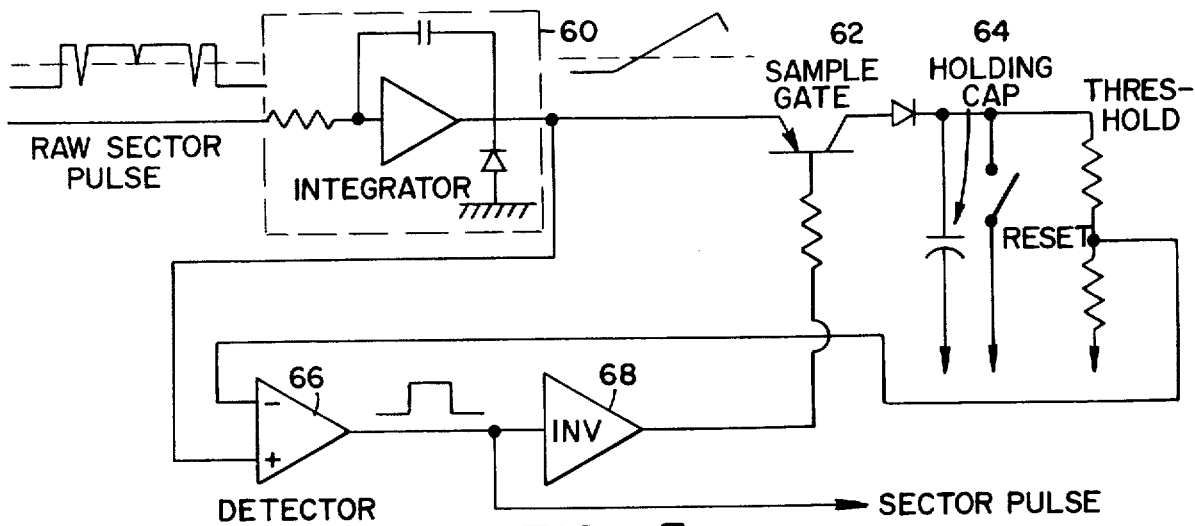
FIG_5
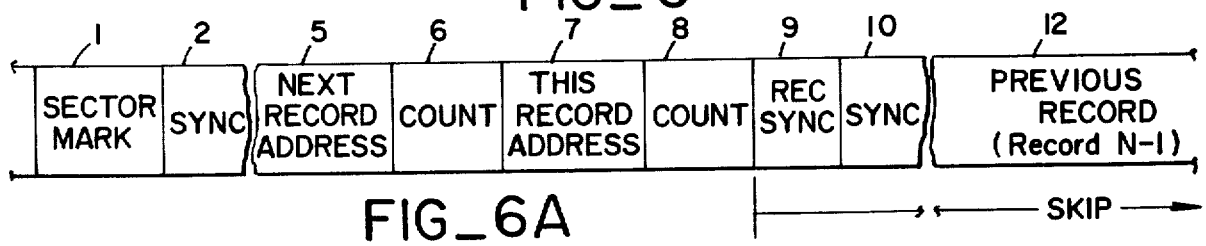
FIG_6A
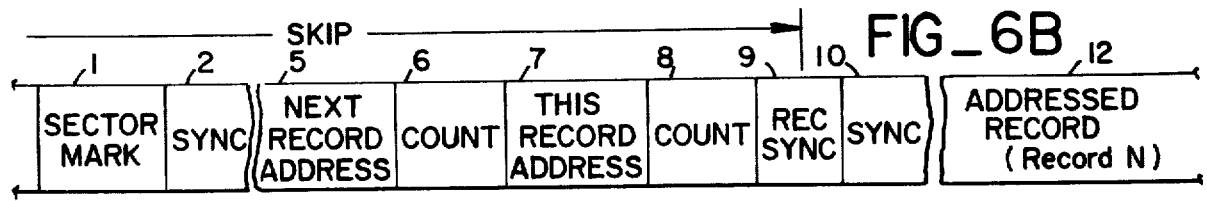
FIG_6B
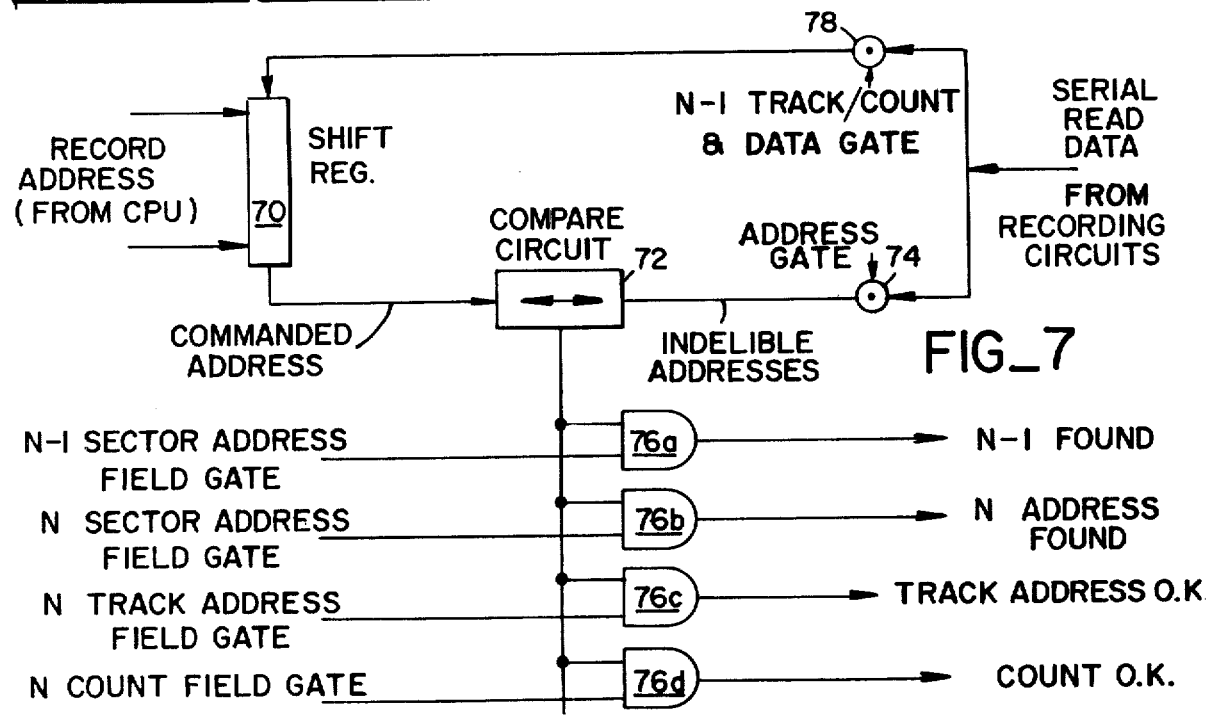
FIG_7

DISC CARTRIDGE SECTOR FORMATTING ARRANGEMENT AND RECORD ADDRESSING SYSTEM

This is a continuation division, of application Ser. No. 256,602, filed May 24, 1972, now abandoned.

The present invention relates to magnetic disc file information storage systems and is more specifically directed to an improved record addressing and control system for a removable cartridge disc file and to the sector formatting arrangement associated therewith.

Early sectoring techniques for locating an addressed record on a magnetic disc typically involved an optoelectronic transducer system wherein a light source located within the disc hub generated a series of narrow radially projecting beams by directing the light through a number of machined slits spaced around the hub circumference. A stationary photosensitive device sequentially detected the passage of the light beams as the disc and hub rotated past the sensing station. Each occurrence of a light beam indicated the beginning of a new sector. These optoelectronic systems possessed an inherent lack of precision, both in manufacture and in use. For example, factors such as slight errors in slit position, lamp failure, dust build-up in the slit impairing the light received by the photosensor, and electrical failures or noise all contributed to degrade system performance. Reliability was further adversely affected by the fact that these problems were often intermittent and, therefore, difficult to detect.

Later types of sector detection and record formatting systems combined an opto-electronic sector transducing system such as described above with indelible track and record address fields electromagnetically written on the disc. In these systems, a transducer output pulse indicated the beginning of a new sector and the encoded address information functioned as a sector lable which was interpreted to specifically identify the track and record. These encoded addresses were indelible in the sense that erasure of the labels required activation of a switch which was ordinarily inaccessible to the user.

Subsequent record addressing schemes replaced the several optically transduced sector pulses by a single index or reference pulse and used electronic sector addressing to determine the angular position of a particular record relative to the index. This arrangement eliminated the fixed sector lengths dictated by the hub slit spacing and thus provided the capability of writing variable length records. However, these mixed systems which combined optical detection of a single index point with electronic decoding of a magnetically recorded address field associated with each sector provided only a partial solution to the problems inherent in optical sensing as described above. For example, the accuracy of all addressing depended ultimately upon the reliability of the index pulse. Also, since the detection of a new sector depended on decoding specific address words, a high degree of synchronization had to be maintained throughout the entire track revolution.

More recently disc formatting systems have become available which provide the capability of variable sector length in addition to allowing the user to reformat the sectors as desired, but only at the cost of highly complex controllers with expensive electronic control circuitry or mini-computers which must be associated with each disc file unit in the field.

In contrast, the present invention provides a system for electronically pre-recording indelible sector mark and record format information on a magnetic cartridge disc at the factory using a high precision standard cartridge writer to achieve improved reliability, efficiency and flexibility of the disc file in the user environment.

According to the invention, the format fields in each track which identify the data in the corresponding sector are factory recorded by a standard cartridge writer which electronically phase-locks the recording clock to a digital magnetically recorded clocking disc rotating on the same shaft as the disc, such that an exact number of bytes are recorded on each track with precise physical relationship to each other. This information is made indelible by suitably programming the disc file controller to prohibit writing in the address fields.

Because of the precision nature of the cartridge writer and the controlled factory recording environment, normal recording tolerances are effectively eliminated. Also, since use of a limited number of factory cartridge writers can economically justify more sophisticated control techniques than available with controller units associated with the disc file in the field, it is possible to put more constraints on the method of sector pulse formation with a resultant higher degree of reliability on readout. The standard cartridge writer replaces the complex electronic reformatting circuitry necessary with existing disc file systems at a substantial reduction in user cost. If reformatting should be necessary, the small cartridge may be easily returned to the factory by mail.

Accordingly, it is a primary object of the present invention to provide a sector detection and record formatting system having a high degree of reliability wherein the sector mark and format information are indelibly recorded at the factory in a carefully controlled recording environment.

It is a further object of the present invention to provide an improved record addressing and control system of the above character which immediately reads the sector and address information being recorded and certifies its quality.

It is yet another object of the present invention to provide a record addressing system of the above character which includes means for generating separate recording clock frequencies for sector mark coding on one hand and record format information and working data on the other to give the greatest frequency spectral separation for optimum sector detection reliability.

A still further object of the present invention is to provide a record addressing system of the above character having improved efficiency resulting from the capability of varying the length of sector mark code in accordance with record length to optimize the number of format bits required for reliable sector detection with records of a given length. This feature allows efficient storage of a large number of small unit records to the point where the format bits dominate.

Yet another object of the present invention is to provide a disc file control system which includes a simple yet highly efficient mechanism for address checking and for data recover in case of any single failure of the pre-recorded address information, thus insuring that no data is lost.

According to the present invention the cartridge, disc drive and associated controller require neither additional magnetic read heads or electromechanical hardware such as phototransducers to detect index or sector pulses, nor complex electronic data checking circuitry.

These and other objects, features and advantages of the present invention will be more readily apparent after reading the following detailed description with reference to the accompanying drawings wherein:

FIG. 1 is a diagram of the field format of a typical disc sector according to a preferred embodiment of the present invention;

FIG. 2 is an information-flow block diagram of the computer and controller which provide inputs and outputs to the standard cartridge writer used to pre-record sector mark and record format information on the disc;

FIG. 3 is a functional block diagram of the standard cartridge writer showing the interconnection of its component elements;

FIG. 4 is a functional block diagram of the electronic sector mark detection system associated with the disc file unit;

FIG. 5 is an electrical schematic diagram of the adaptive threshold sector detection circuitry of FIG. 4;

FIGS. 6A and 6B are schematic diagrams of two consecutive sectors on the disc illustrating the method of data recovery in case of an address error; and FIG. 7 is a functional block diagram of one form of address checking system according to the present invention.

Referring now to the drawings, in reference to FIG. 1, the format of a typical disc sector in terms of its component fields will be described. Fields 1 through 8 are indelibly written sector marking, addressing, checking and synchronizing fields. This area is pre-written by the standard cartridge writer at the factory. Fields 9 through 14 comprise the record information and are re-recorded each time a new record is written. Significantly, each record has the same format and there is no indexing pulse giving true random addressing.

Field 1 contains the sector mark code which is a string of ones bits whose length is proportional to the size of the data record in field 12. This produces a sector pulse in the detection circuitry to be described below whose width varies in proportion to the length of the record. The reason for the variable length sector pulse is that the sector mark recording system of the present invention provides just enough sector information to be reliably distinguished by the detection circuitry from uncontrolled and uncertain bit transitions in the region of the record end. Depending on the rotational speed of the disc during recording, the longer the data record the longer is the undefined writing area at the end of the record, sometimes referred to as the splash area, and the higher is the probability that a sector pulse will be erroneously detected in this region.

When used with suitable control circuitry, a sector pulse code which is proportional to the record length provides optimal sector detection. For example, a system which allows record lengths from 32 bytes to 512 bytes might require ± 2% of this length for sector mark coding. This means the sector pulse width should optimally vary between 1.2 bytes and 20 bytes. In conventional mixed format electronically sectored machines, however, a fixed number of bytes is required for all records, for example, the maximum required length, 20 bytes. Typical tradeoffs in past machinery allows a compromise to about 10 bytes. If the detector is made "stiff", the probability of missing a sector mark is increased; if the detector is made "loose", there is an increased probability of detecting an erroneous sector pulse in the splash area, particularly in long record formats.

The present invention, on the other hand, makes no such compromise and provides the least amount of sector mark code consistent with reliable detection for a given length of record. The computer associated with the standard cartridge writer determines this optimal length of sector mark code according to an input algorithm using the customer's specification of desired record length, spacing, etc. According to the present invention, significant improvements can be made in lowering the numer of format bits (overhead) associated with each record, thus making it possible to store a large number of small unit records up to the point where the format bits dominate while still providing good efficiency. For example, an efficiency of 64% (proportion of data to total sector length) can be achieved in recording 100 records of 32 bytes each on a track.

Field 2 includes a burst of sync bits which is long enough for the disc drive controller detection circuitry to become synchronized with the indelible encoded address information in fields 4 through 8. Field 3 contains a start address mark which signals the beginning of the address information.

Field 4 is the track number byte which contains the address of the track on which the record is recorded. For purposes of record address comparison as discussed hereinafter, the track address is a necessary part of the required sector address:

Field 5 contains the encoded logical number of the record in the immediately following sector and field 6 specifies its length. Similarly, field 7 contains the encoded logical number of the present sector and field 8 indicates its length. Fields 5–6 and 7–8 are used in conjunction with the address checking and data recovery circuitry described below in connection with FIGS. 6 and 7.

In the data recovery mode, fields 1 through 8 of the sector containing the address error are skipped and the address information read in the preceding section is used to initiate reading of the error-containing sector within the bounds of field 9. This may be accomplished, for example, by using a precision crystal oscillator to count down a binary counter whose initial count represents the time for the required skip distance since at a given disc velocity, distance is proportional to time. Field 9 contains a string of sync bits at the data record clock frequency which synchronize the detection circuitry to the record information within field 12. The length of field 9 is adjusted to eliminate the effects of speed variations in the disc drive motor and insure that reading begins in the synchronizing area.

Field 10 contains a sequence of sync bits identical to those in field 9 and functions as a fixed-length extension thereof in synchronizing the detection circuitry to the disc file recording clock. As noted above, the sync bits within field 2 serve a corresponding function with respect to the address information pre-recorded at the factory in fields 2–8. Field 11 contains a start record mark signaling the beginning of the data written within field 12 and field 13 contains a fixed-length word which functions as a cyclical redundancy check. Field 14 is the record end tolerance or "splash" area used to account for slight differences in record length due to variations in disc speed and insures that the sector mark code for the following sector does not overlap the end of the previous data record. Fields 12 and 14 are initially pre-recorded at the factory with all ones bits.

It will be apparent that any address numbering or coding scheme may be adopted within the general format of the present invention with the sole restriction being that areas corresponding to fields 5 and 6 in any given record are coded the same as areas in the next record corresponding the fields 7 and 8 of the illustrated arrangement.

Referring now to FIGS. 2 and 3, the functional interrelationship of the various components of the standard cartridge writer used to indelibly pre-record sector mark and format information will be described. A general purpose programmable digital computer 16 receives input instructions in the form of format algorithms and sequences modified by customer specifications fixing the format parameters for the desired disc configuration. For example, to provide for increased throughput during sequential processing applications, the customer might specify a format arrangement wherein logically consecutive data records are staggered around the disc in every third sector. This allows for electronic recovery time in the read amplifier area between the writing of the data record and the reading of the next sector label. The customer could also specify, for example, the length of the record area and the number of records written on any one track up to some maximum.

A control unit 18 interfaces with computer 16 through data, clock and control lines and provides standard inputs and outputs to the cartridge writer recording and checking circuitry as follows. Conrol unit 18 transmits the format information—including track number, record address and count—to write circuitry 20. The optimal length of the sector mark code is computed and the format information determined according to the algorithm input to computer 16. The format data and the sector mark code are each clocked to the cartridge read/write head 22 through circuit 20 at different frequencies as determined by write oscillator 24 and sector oscillator 26, respectively.

Write oscillator 24 is gated to the write circuits 20 through data write gate 28 which functions as a normally closed switch and provides the clock for the address information written in fields 2 through 8. When computer 16 requests writing of the sector mark code, control unit 18 outputs a control signal which enables sector write gate 30 connecting sector oscillator 26 to the recording circuits 20. At the same time, data write gate 28 is disabled unlatching write oscillator 24 from the recording circuits.

Use of separate clock frequencies for writing the sector mark code and format information provides increased reliability of the sector mark detection system associated with the disc drive in the field. This is due to the fact that when data is written in coded patterns, even though a fixed clock frequency is used, many harmonics of the basic frequency will appear within the data producing a spectral distribution of varying pulse widths depending on the bandpass of the recording channel and the recording head and media itself. This creates problems in conventional detection systems in distinguishing a sector pulse from data which might contain the same frequency distribution. The problem is further aggravated by the existence of indeterminate variables such as cross talk, noise, etc. These factors make it especially difficult to distinguish the sector code from the splash area of the record which immediately precedes it.

Existing systems attempt to solve this detection problem by using some subdivision of the recording clock frequency for the sector mark and employ a coded pulse pattern which presumably cannot appear within the data. These systems, however, operate on a very narrow margin in distinguishing sector and data frequencies. The present invention, in contrast, provides optimal sector mark detection by using completely different clocks for sector mark and format data, thus providing the greatest possible spectral separation.

Control unit 18 supplies a track address control signal to head positioner 32 and servo element 34 which control the radial position of head 22 over cartridge disc 36 which is being formatted.

A significant feature of the present invention relates to the use of a magnetically recorded clocking disc 38 mounted to and rotatable with disc cartridge shaft 40. A magnetic-electronic transducer 30 such as a conventional read head is associated with clocking disc 38 and senses the signals magnetically recorded on the disc providing an electronic output signal to phase-lock circuit 42 in response thereto. Clocking disc 38 and transducer 30 are used to phase-lock write oscillator 24 to the angular position of disc 36 through circuit 42 thus providing precision generation of the disc format. The recording precision obtained by use of transducer 30 effectively eliminates the high sector end (splash area) overhead caused by mechanical and electrical tolerances in generating sector pulses and by motor speed variations during format generation.

Sector detector circuit 44 and data detector circuit 46, respectively, provide sector pulse and data signals to control unit 18 for verification of recording accuracy by computer 16.

It will be appreciated by one skilled in the art that the individual components of the standard cartridge writer are, with the exception of the rotating magnetically recorded clocking disc 38, of conventional design such as may be found in typical movable-arm disc storage systems.

Referring now to FIGS. 4 and 5, the sector mark detection circuitry associated with the disc drive controller in the user environment will be described. Read/write head 50 supplies the information being read from the disc to preamp 52 which provides an amplified signal for the data detection circuits of the disc drive controller and system computer (not shown). This amplified signal is also applied to the input of optimal filter 54. The output of optimal filter 54 is processed by adaptive threshold detector 56 which provides a final sector pulse to the controller.

Optimal filter 54 and adaptive threshold detector 56 together function to block all information which might otherwise erroneously be interpreted as a sector mark. For example, in addition to eliminating drop-out and system noise embedded in the true sector pulse, circuits 54 and 56 are tuned to interpret the indelible address information as well as the data record information as noise and, therefore, eliminate the possiblity of erroneously interpreting these signals as a sector mark.

The circuit arrangement of the adaptive threshold detector 56 is shown in more detail in FIG. 5. This circuitry automatically adjusts the detection to the longest pulse within a track by integrating the number of sector coded bits and providing a sector mark output when a tuned percentage is reached in relatiomship to the maximum sector pulse length. For example, a longer format will require a longer sector pulse due to the increased splash area and resulting probability of erroneous sector detection within that region.

Integrator 60 transforms the raw sector pulse (shown at the integrator input) into a signal (shown at the output) whose amplitude is proportional to the pulse width. The maximum amplitude of this signal is sampled and held by sample gate 62 and holding capacitor 64 which sets the output threshold to the longest pulse width. Holding capacitor 64 is chosen to have a slight decay to eventually adjust to smaller pulse width. Detector 66 processes the final sector pulse, and invertor 68 supplies the sample gate bias from the detector output.

The address checking and data recovery features of the disc file detection system will now be described in reference to FIGS. 6 and 7. The improved methods of address checking and data recovery employed by the present invention provide significant cost savings and improved reliability in checking indelible addresses while providing the added functions of isolating the field in error (i.e., track and record length) and providing a more reliable automatic recovery. This method takes advantage of the sequential and physically automatous nature of adjacent but separate sectors and lends itself to simple recovery methods.

According to this system, fields 4, 5 and 6 (FIG. 1) in each sector are compared to the desired address requested by the computer. When a satisfactory comparison is made, fields 4, 7 and 8 of the following sector are compared against the desired address. If this second comparison is also made, reading and writing operations can take place on that record. If either comparison fails, writing is inhibited and an appropriate status flag is set for computer interrogation.

For example, if the first comparison cannot be made on fields 4, 5 and 6 within several disc revolutions, the second comparison will be attempted and if made, that record will be read. However, an appropriate status flag will be set indicating an error in the address portion of the sector immediately preceding the one containing the desired information. On the other hand, if the first comparison is made but no sector can be found in which fields 4, 7 and 8 provide a match, a data recovery sequence will ensue to retrieve the data written in the sector following the one providing the initial match as follows.

As most clearly shown in FIGS. 6A and 6B, if the track, next record address, and next record count, fields 4, 5 and 6, of a given record (Record N-1) match the computer requested address but fields 4, 7 and 8 of the following record (Record N) do not, this indicates an address error in Record N. In this situation, reading of the erroneous address will be suppressed by skipping to the recovery sync field 9 of the error-containing sector. The distance skipped is determined according to the formula:

Skip Length = $(l + k) \times C + L_4$, where $k$ is a constant proportional to the length of fields 14, 9 and 1 (see FIG. 1)

$C$ is the record length of the previous record, and $L_4$ is the length of the fixed portion of the address.

As can be seen from inspection, this formula merely computes the length of the fixed and variable portions of the erroneous address based on information from the previous sector address label and adds this length to the record which immediately precedes the error-containing sector.

Referring now to FIG. 7, an implementation of the address checking and data recovery system of the present invention will be described illustrating the inherent simplicity of the scheme and required circuitry. The requested record address furnished by the computer central processing unit is input in bit-parallel form to shift register 70 which feeds one input of comparator circuit 72. A bit-serial data stream from the disc drive detection circuits is supplied to the other input of comparator 72 through address gate 74. The output of comparator circuit 72 is applied to one input of AND gates 76a through 76d. The other input of these AND gates is supplied with a timing signal indicating which fields comparator 72 is testing for a match.

For example, when the N-1 sector address (field 5) is being checked, the timing signal applied to gate 76a will be present. If a match is found by comparator 72, the other input signal to gate 76a will also be present and the gate will set a flip-flop (not shown) indicating the occurrence of the particular condition, in this case, an address match in sector N-1. If a match is not made, the flip-flop will be reset indicating an error condition. Gate 76b provides a similar function with respect to an address match within sector N (field 7).

In another checking mode, the N-1 track and count information will be loaded into shift register 70 and compared within circuit 72 against the corresponding information in sector N. A successful match will set appropriate flip-flops through AND gates 76c and 76d indicating track and count consistency. A non-match condition will reset the flip-flop causing computer interrogation. Writing will be inhibited thus preventing sector override in the case of either computer program or cartridge failure.

It will be seen that the same pathing used for data is also used for address certification so that the system provides a great deal of flexibility in setting conditions to provide addressing information with an extremely simple circuit built around a single bit-serial comparator. In addition, since the same magnetic sensing element used for data decoding is also used for sector detection, costly additional sector or index transducers are not required.

It will be appreciated by those skilled in the art that the present invention is not limited to the particular embodiments shown and described herein which are intended as illustrative only, and that various modifications and adaptations thereof can be made without departing from the scope of the invention as defined by the appended claims.

We claim:

1. In a computer controlled magnetic disc formatting arrangement of the type wherein sector mark code signals and format data signals are supplied to a write head for recording on a disc to be formatted, the improvement comprising:

a first oscillator for supplying a recording clock for said format data signals at a first frequency;

a second oscillator for supplying a recording clock for said sector mark code signals at a second frequency;

switching means for connecting said first oscillator output to said write head during recording to said sector mark code signals and for connecting said second oscillator output to said write head recording of said format data signals;

sensing means for reading the signals recorded on said disc by said write head;

sector detection circuit means having an input responsive to said sensing means for producing a sector pulse to an output upon detection of said sector detection circuit means comprising an optimal filter having an input responsive to said sensing means for removing noise and other extraneous signal distortion from said sector mark signal and supplying a filtered sector pulse at an output, and an adaptive threshold detector having an input responsive to the output of said optimal filter for providing a final sector pulse output only when the width of said filtered sector pulse exceeds a selected percentage of the maximum sector pulse width within the track containing said filtered sector pulse; and, data detection means having an input responsive to said sensing means for providing a data checking signal at an output for certification thereof.

2. The arrangement of claim 1 wherein said recording clock from said first oscillator and said recording clock from said second oscillator have widely separated frequencies to facilitate distinguishing said sector mark code signals recorded on said disc from said format data signals recorded on said disc during reading thereof.

3. The arrangement of claim 1 further comprising:
a magnetically recorded clocking disc fixedly mounted to said disc to be formatted for synchronized rotation therewith;
a magnetic-electronic transducer associated with said clocking disc in operative proximity thereto; and
a phase-lock circuit having an input responsive to the output of said transducer and having an input-output interface with said first oscillator for precisely synchronizing said sector mark code and formating data signals to the angular position of said disc.

4. The arrangement of claim 1 further comprising:
a head positioner element connected to said write head for providing radial movement thereof with respect to said disc;
A servo element responsive to a track address signal for controlling said positioner to locate said head over said disc in response thereto; and,
write circuit means having an input responsive to said sector mark code signals and said format data signals and to said recording clock signals from said first and second oscillators, said write circuit means having an output connected to said write head, whereby said format data is clocked to said write head at said first frequency and said sector mark code is clocked to said write head at said second frequency.

5. The arrangement of claim 1 wherein said adaptive threshold detector comprises:
an integrator having an input connected to the output of said optimal filter;
a sample and hold circuit having an input connected to the output of said integrator;
a detector having an input connected to the output of said integrator and having an output carrying said final sector pulse; and,
an invertor having an input connected to the output of said detector and having an output connected to the sample gate of said sample and hold circuit to control said gate.

6. The method of formatting a sector within a track of a magnetic information storage disc comprising the steps of:

recording at a first clock frequency in a first field of said sector a sector mark code having a length proportional to the length of the data record to be contained within said sector;
recording at a second clock freqency in a second field of said sector an encoded word representing the logical address of said data record within said sector; and,
recording at said second clock frequency in a third field of said sector an encoded word representing the logical address of the data record contained within the next successive sector of said track.

7. The method of claim 6 comprising the further step of detecting said previously recorded sector mark code for certification of the accuracy thereof.

8. The method of claim 6 comprising the further step of detecting said encoded words within said second and third fields for verification of the accuracy thereof.

9. The method of using a magnetic recording head to format a disc sector comprising the steps of:
supplying a sector mark code having a length proportional to the length of the data record to be recorded within said sector;
supplying a sequence of format information, said sequence including a first encoded word representing the logical address of the data record within said sector, and a second encoded word representing the logical address of the data record within the next successive sector;
generating a first clocking signal;
generating a second clocking signal at a different frequency from said first clocking signal; and,
gating said sector mark code to said recording head at said first clocking frequency, and gating said format information to said recording head at said second clocking frequency to record said sector mark code in a first field of said sector, said first encoded word in second field of said sector and said second encoded word in a third field of said sector.

10. The method of locating a computer addressed data record within a track of a magnetic information storage disc comprising the steps of:
detecting in a first field of each sector within said track a first encoded word representing the logical address of the record contained in the next successive sector within said track;
making a first comparison between each of said first encoded words within said first fields and the logical address of the record requested by said computer;
detecting in a second field of the next successive sector within said track a second encoded word representing the logical address of the data record within said next successive sector;
making a second comparison between said second encoded word in said second field of said next successive sector and the logical address of the record requested by said computer; and,
reading out the record in said next successive sector after performing said first and second comparisons.

11. The method of claim 10 further including the step of generating an error message indicating an address error in the sector immediately preceding the sector containing the matching word when said first comparison does not produce a match and said second comparison produces a match.

12. The method of claim 10 further including the step of generating an error signal indicating an address error in the sector containing said data record when said first comparison produces a match and said second comparison does not produce a match.

13. In a magnetic information storage disc having a plurality of tracks thereon, each track containing a plurality of sectors, each of said sectors including a data record portion and an identification portion containing the logical address of the data record within said sector, the improvement wherein said identification portion of each said sector includes the logical address of the data record within the next logically successive sector in the same track of said disc.

14. In a magnetic information storage disc having a plurality of tracks, each track having a plurality of sectors each sector containing a sector mark code identifying the beginning of said sector, the improvement wherein said sector mark code has a length which is proportional to the length of the data record within said sector.

* * * * *